(12) United States Patent
Robarge et al.

(10) Patent No.: US 9,129,760 B2
(45) Date of Patent: Sep. 8, 2015

(54) SHUTTER SYSTEM FOR A SWITCHGEAR COMPARTMENT AND METHOD OF MANIPULATING A SHUTTER SYSTEM

(71) Applicant: General Electric Company, Schenectady, NY (US)

(72) Inventors: Dean Arthur Robarge, Southington, CT (US); Brittany Leigh Estes, Middletown, CT (US); Michael Paul Lafond, Wallingford, CT (US); Joseph Gustave Nagy, Southington, CT (US); Jason William Newby, Wallingford, CT (US); Gerald John Witkoski, Burlington, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 360 days.

(21) Appl. No.: 13/735,518

(22) Filed: Jan. 7, 2013

(65) Prior Publication Data

US 2014/0190801 A1   Jul. 10, 2014

(51) Int. Cl.
*H01H 9/22* (2006.01)
*H02B 11/24* (2006.01)

(52) U.S. Cl.
CPC ........................................ *H01H 9/22* (2013.01)

(58) Field of Classification Search
CPC .................................. H01H 9/22; H02B 11/24
USPC .......... 200/50.21, 50.22–50.29; 361/607, 617
See application file for complete search history.

(56) References Cited

U.S. PATENT DOCUMENTS

| | | | |
|---|---|---|---|
| 2,691,713 A | 10/1954 | Astin et al. | |
| 3,610,850 A | 10/1971 | Eichelberger | |
| 3,614,350 A | 10/1971 | Eichelberger et al. | |
| 3,778,568 A | 12/1973 | Wilson | |
| 4,025,747 A | 5/1977 | Bharteey et al. | |
| 4,183,073 A | 1/1980 | Clausing | |
| 4,285,026 A | 8/1981 | Clausing | |
| 4,417,108 A | 11/1983 | Vaill et al. | |
| 4,423,336 A | 12/1983 | Iverson et al. | |
| 4,713,501 A * | 12/1987 | Herrmann | 200/50.22 |
| 5,757,260 A | 5/1998 | Smith et al. | |
| 8,809,705 B2 * | 8/2014 | Serrano et al. | 200/50.21 |
| 8,917,494 B2 * | 12/2014 | Parkerson | 200/50.22 |

* cited by examiner

*Primary Examiner* — Amy Cohen Johnson
*Assistant Examiner* — Marina Fishman
(74) *Attorney, Agent, or Firm* — GE Global Patent Operation; Stephen G. Midgley (57) ABSTRACT

A shutter system for a switchgear compartment includes a moveable shutter translatable between a closed position and an open position. Also included is a pusher operatively coupled to a first side of the moveable shutter and configured to impart a force on the moveable shutter in response to an insertion of an electrical device within the switchgear compartment. Further included is a cam member having a cam shaft operatively coupled to the moveable shutter, the cam shaft having a cam track. Yet further included is a bell crank configured to guide along the cam track and translate the moveable shutter between the closed position and the open position.

20 Claims, 6 Drawing Sheets

SHUTTER SYSTEM FOR A SWITCHGEAR COMPARTMENT AND METHOD OF MANIPULATING A SHUTTER SYSTEM

BACKGROUND OF THE INVENTION

The subject matter disclosed herein relates to switchgears, and more particularly to a shutter system for a switchgear compartment, as well as a method of manipulating the shutter system.

Switchgear arrangements typically include a plurality of compartments configured to house various electrical devices to be engaged with electrical components disposed in a main circuit portion of the switchgear arrangement. A protective barrier referred to as a shutter system is often disposed within the compartments, typically at a rear portion of the compartments. The shutter system includes a plate having a plurality of apertures, with the apertures moveable between an open position and a closed position upon movement of the plate. The shutter system must open at prescribed times in a connecting sequence when inserting an electrical device into the compartment, while remaining closed in the absence of an electrical device to provide protection to individuals and the environment in close proximity to the electrical components that would otherwise be exposed. The protection is afforded in the closed position by not allowing exposure of electrical components of the main circuit portion that are blocked by the shutter system.

The plate moves in a first direction to align the apertures with the electrical components of the main circuit portion and in a second direction to adequately expose the electrical components by drawing the plate into close proximity with the electrical components. The above-described shutter system typically requires multiple mechanisms, such as complex linkages, to provide desired functionality of the shutter system. Specifically, a first mechanism is employed to align the apertures and a second mechanism is employed to draw the plate into close proximity with the electrical components. Unfortunately, based on the number of mechanisms and the complexity of the mechanisms, unsatisfactory movement in either the first or second direction is often obtained.

BRIEF DESCRIPTION OF THE INVENTION

According to one aspect of the invention, a shutter system for a switchgear compartment includes a moveable shutter translatable between a closed position and an open position. Also included is a pusher operatively coupled to a first side of the moveable shutter and configured to impart a force on the moveable shutter in response to an insertion of an electrical device within the switchgear compartment. Further included is a cam member having a cam shaft operatively coupled to the moveable shutter, the cam shaft having a cam track. Yet further included is a bell crank configured to guide along the cam track and translate the moveable shutter between the closed position and the open position.

According to another aspect of the invention, a shutter system for a switchgear compartment includes a fixed shutter comprising a plurality of fixed shutter apertures. Also included is a moveable shutter comprising a plurality of moveable shutter apertures, the moveable shutter comprising an open position and a closed position, wherein the plurality of moveable shutter apertures is aligned with the plurality of fixed shutter apertures in the open position, and wherein the plurality of moveable shutter apertures is misaligned with the plurality of fixed shutter apertures in the closed position. Further included is a pusher operatively coupled to a first side of the moveable shutter. Yet further included is a bell crank in operable communication with the moveable shutter. Also included is a cam member operably coupled to at least one wall of a breaker compartment and comprising a cam shaft operatively coupled to the fixed shutter and the moveable shutter, the cam member having a cam track configured to guide the bell crank for translating the moveable shutter between the closed position and the open position.

According to yet another aspect of the invention, a method of manipulating a shutter system for a switchgear compartment is provided. The method includes imparting a force on a pusher operatively coupled to a first side of a moveable shutter. Also included is rotating and translating a bell crank along a cam track of a cam shaft extending through the moveable shutter, the bell crank in operable communication with the moveable shutter. Further included is translating the moveable shutter from a closed position to an open position upon rotation of the bell crank.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
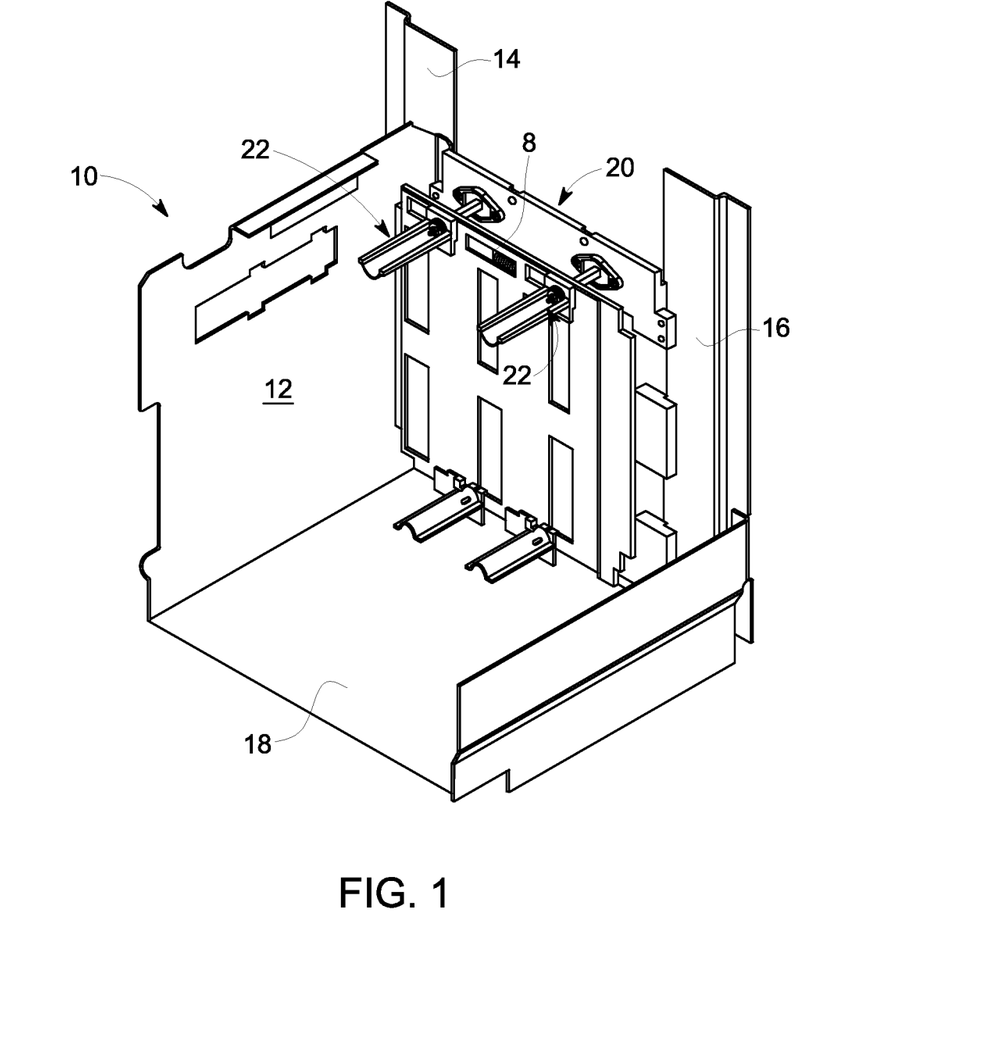
FIG. 1 is a partial, perspective view of a switchgear compartment.

Referring to FIG. 1, a switchgear compartment 10 is partially illustrated. The switchgear compartment 10 is at least partially defined by a first sidewall 12, a first end wall portion 14, a second end wall portion 16 and a base portion 18. It is to be appreciated that a second sidewall and an overhang wall are not shown for illustration clarity. The switchgear compartment 10 is configured to receive one or more electrical devices (not illustrated) for housing therein and to be electrically connected with one or more electrical components disposed proximate the first end wall portion 14 and the second end wall portion 16. The switchgear compartment 10 may house numerous types of electrical devices for operation therein, such as a circuit breaker, a switch and an arc vault, for example. To prevent exposure of the one or more electrical components disposed proximate the first end wall portion 14 and the second end wall portion 16 in the absence of an electrical device in the switchgear compartment 10, a shutter system 20 is disposed proximate the first end wall portion 14 and the second end wall portion 16.

The shutter system 20 includes a pusher 22 extending away from the shutter system 20 and configured to engage an electrical device, such as a circuit breaker, upon insertion of the electrical device into the switchgear compartment 10. As illustrated, the shutter system 20 typically includes a plurality of pushers, and in the exemplary embodiment, a first pair of pushers and a second pair of pushers are included. For simplicity of description, a single pusher, and associated components, will be described in detail below, as it can be appreciated that the additional pushers are similar in construction to the pusher 22 described herein.

Figure 2:
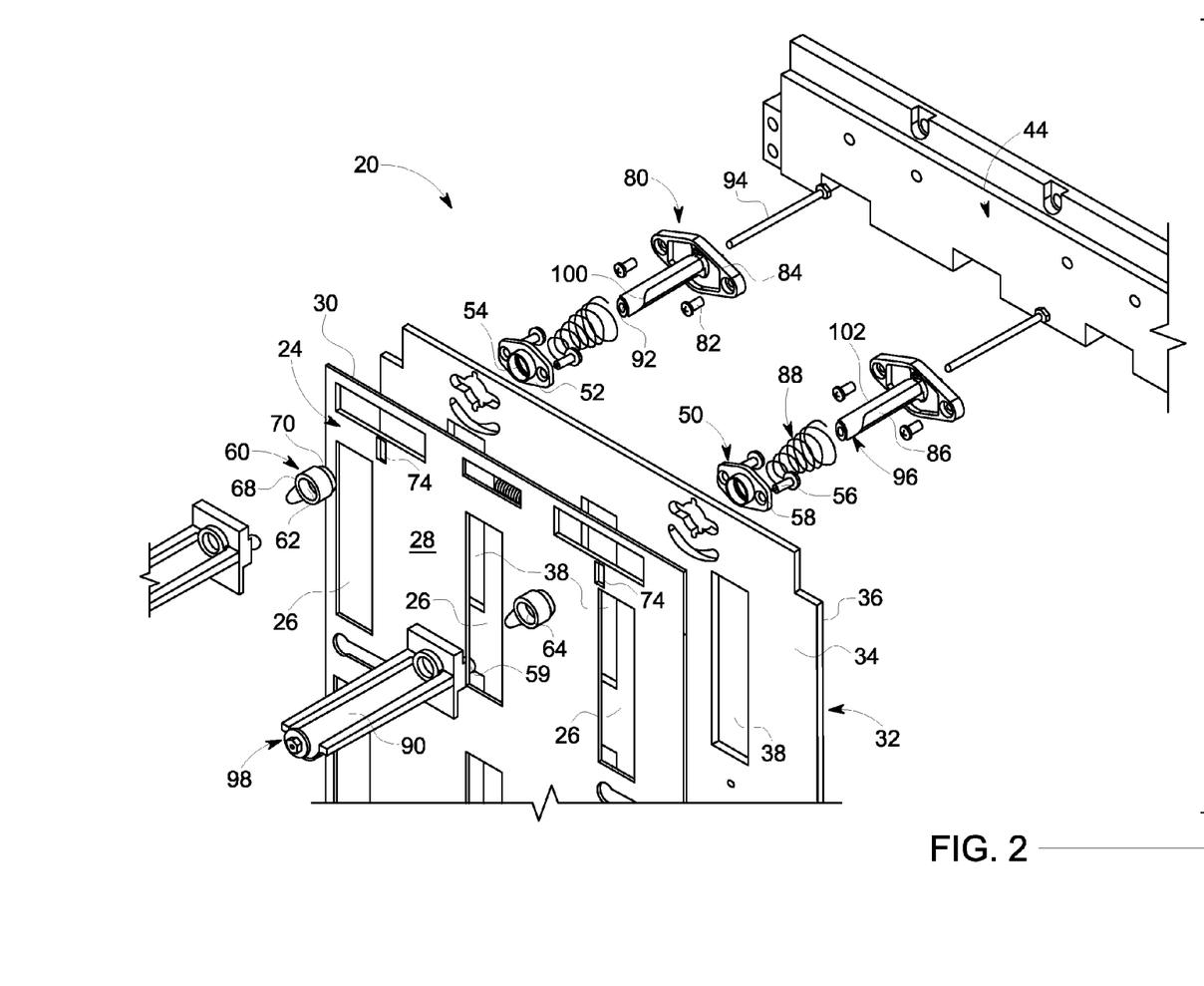
FIG. 2 is a perspective, exploded view of a shutter system of the switchgear compartment.

Referring now to FIG. 2, the shutter system 20 is partially illustrated in an exploded view. The shutter system 20 includes a moveable shutter 24 having a plurality of moveable shutter apertures 26 configured to provide access to electrical components. The moveable shutter 24 includes a first side 28 and a second side 30. A fixed shutter 32 includes a first surface 34 and a second surface 36, with the first surface 34 disposed proximate the second side 30 of the moveable shutter 24. The fixed shutter 32 includes a plurality of fixed shutter apertures 38 that are configured to provide access to electrical components.

Figure 3:
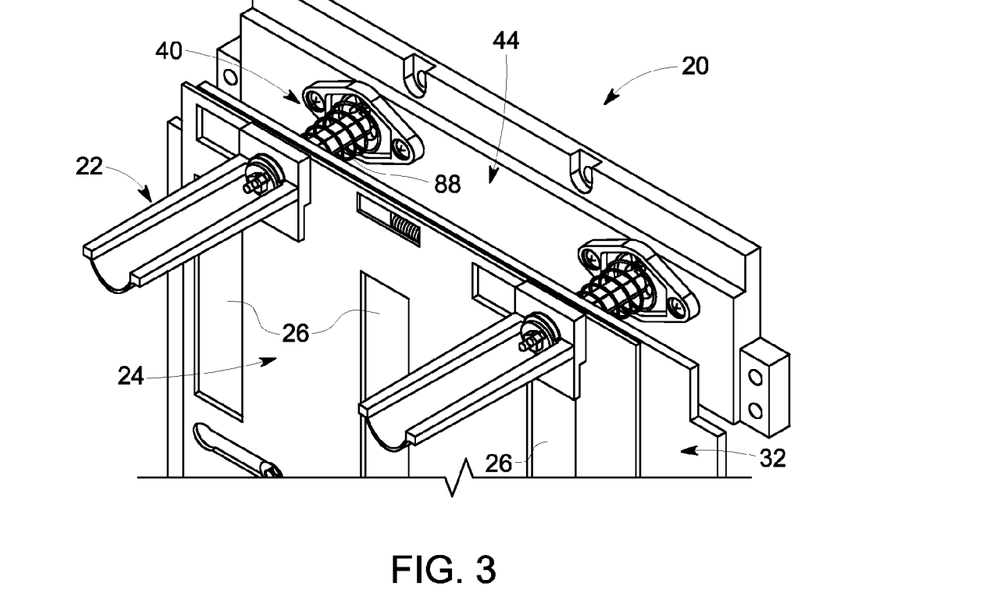
FIG. 3 is a perspective view of the shutter system in a closed position.
Figure 4:
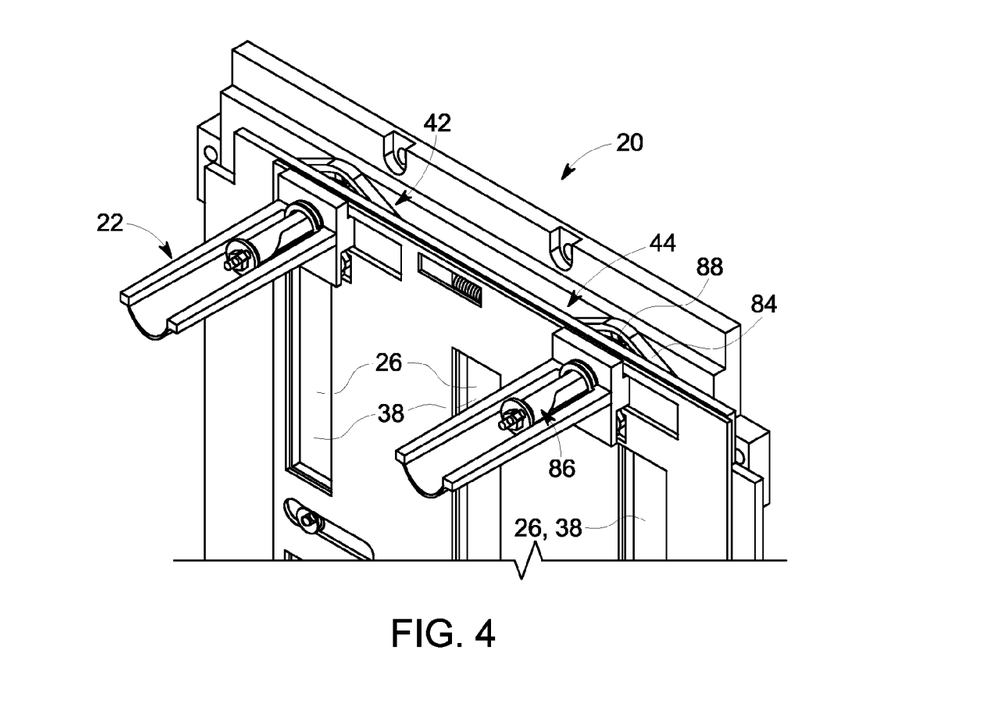
FIG. 4 is a perspective view of the shutter system in an open position.

As will be apparent from the description below, the shutter system 20, and more particularly the moveable shutter 24 and the fixed shutter 32, may be manipulated between a closed position 40 (FIG. 3) and an open position 42 (FIG. 4). The closed position 40 corresponds to misalignment between the plurality of moveable shutter apertures 26 and the plurality of fixed shutter apertures 38. Additionally, in the closed position 40, the moveable shutter 24 and the fixed shutter 32 are spaced a first distance from the first end wall portion 14 and the second end wall portion 16. The open position 42 corresponds to alignment of the plurality of moveable shutter apertures 26 and the plurality of fixed shutter apertures 38, while the moveable shutter 24 and the fixed shutter 32 are spaced a second distance from the first end wall portion 14 and the second end wall portion 16, with the second distance less than the first distance. In other words, the moveable shutter 24 and the fixed shutter 32 are closer to the first end wall portion 14 and the second end wall portion 16 in the open position 42. It can be appreciated that the plurality of fixed shutter apertures 38 are always aligned with the electrical components disposed proximate the second surface 36 of the fixed shutter 32. Alignment of the plurality of moveable shutter apertures 26 with the plurality of fixed shutter apertures 38 provides exposure and access to the electrical components of the switchgear compartment 10 for electrical connection with an electrical device positioned in the switchgear compartment 10. Furthermore, as noted above, the moveable shutter 24 and the fixed shutter 32 are moveable in a fore-aft direction, such that in the open position 42 the moveable shutter 24 and the fixed shutter 32 are moved closer in proximity to the first end wall portion 14 and the second end wall portion 16 to expose the electrical components.

The moveable shutter 24 and the fixed shutter 32 are operably connected to, and supported by, a brace 44 extending between the first end wall portion 14 and the second end wall portion 16. The brace 44 is fixedly secured to the first end wall portion 14 and the second end wall portion 16 to provide stable support for the moveable shutter 24 and the fixed shutter 32. Disposed adjacent to the second surface 36 of the fixed shutter 32 is a retainer plate 50. The retainer plate 50 includes a base plate portion 52 and an opening 54 extending through the base plate portion 52. The retainer plate 50 extends into at least a portion of the fixed shutter 32. The retainer plate 50 is secured to the pusher 22, such as by at least one retainer plate fastener 56. The at least one retainer plate fastener 56 extends through at least one retainer plate aperture 58, as well as through the fixed shutter 32 and the moveable shutter 24 to engage a receptacle 59 on the pusher 22, which is disposed proximate the first side 28 of the moveable shutter 24. Sandwiched between the pusher 22 and the retaining plate 50 is a bell crank 60 that freely rotates between the pusher 22 and the retaining plate 50. The bell crank 60 includes an inner surface 62 defining an opening 64 and at least one protrusion 68 extending inwardly from the inner surface 62. An aft portion 70 of the bell crank 60 is configured to extend into the opening 54 of the retainer plate 50, such that the opening 54 defines an axis of rotation for the bell crank 60. A crank portion 72 (FIGS. 7 and 8) of the bell crank 60 extends into and is disposed within a moveable shutter driver aperture 74. It can be appreciated that rotation of the bell crank 60, and more specifically the crank portion 72 within the moveable shutter driver aperture 74, results in movement of the moveable shutter 24. Such movement facilitates movement of the moveable shutter 24 back and forth between the closed position 40 and the open position 42, which will be described in greater detail.

A cam member 80 is fixedly secured to the brace 44 via one or more cam member fasteners 82. As illustrated, a plurality of cam members may be included. The cam member 80 includes a cam base portion 84 through which the cam member fasteners 82 extend. A cam shaft 86 is integrally formed with the cam base portion 84 and extends away from the cam base portion 84 toward the fixed shutter 32. The cam shaft 86 extends through a spring 88, the opening 54 of the retainer plate 50, the fixed shutter 32, the moveable shutter 24, the opening 64 of the bell crank 60 and the pusher 22. The pusher 22 includes a relatively U-shaped inner surface 90 that the cam shaft 86 rests on. The cam shaft 86 includes a through-hole 92 configured to receive a cam shaft fastener 94 therethrough. The cam shaft fastener 94 extends at least partially out of a first end 96 of the cam shaft 86 for engagement with an end cap fastener 98. A cam track 100 extends along an outer cam shaft surface 102 and is configured to engage the at least one protrusion 68 of the bell crank 60. The bell crank 60 is configured to move along the cam track 100 in both a translational and rotatable manner to various positions. The various positions of the bell crank along the cam track 100 are described in greater detail below. It is to be appreciated that a plurality of cam tracks may be present along the outer cam shaft surface 102, such as a track having a profile for opening functionality and a separate profile for closing functionality. As noted above, a single track may sufficiently provide opening and closing functionality.

Figure 5:
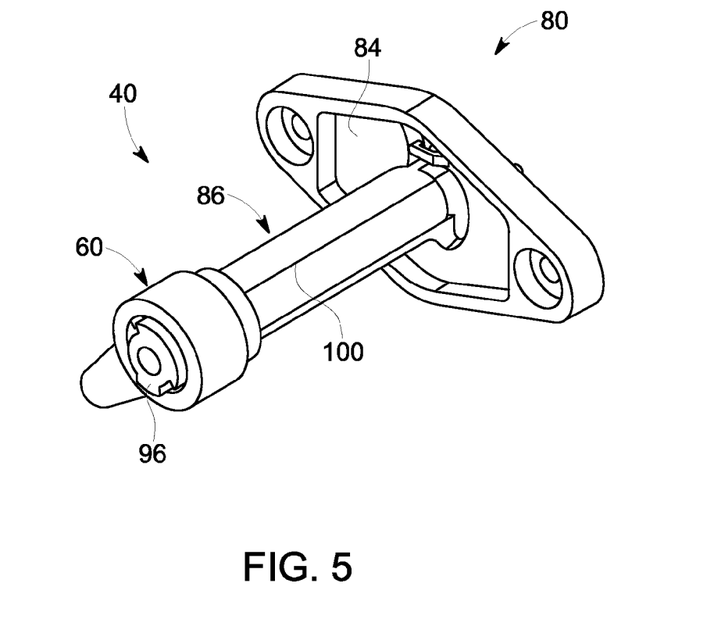
FIG. 5 is a perspective view of a cam member and a bell crank of the shutter system in the closed position.
Figure 6:
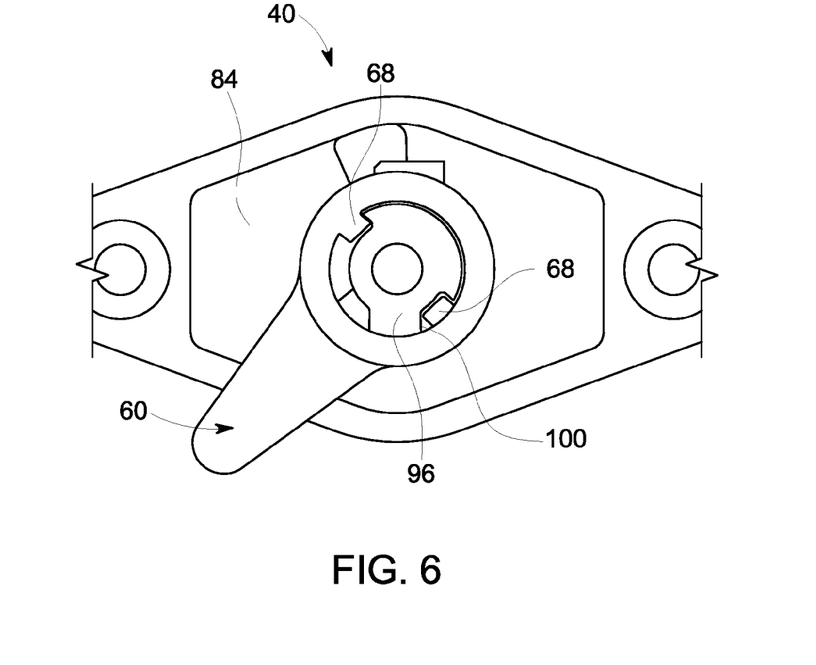
FIG. 6 is a front, elevational view of the cam member and the bell crank of the shutter system in the closed position.

Referring now to FIGS. 3, 5 and 6, the bell crank 60 and therefore the shutter system 20 is illustrated in the closed position 40. In the closed position 40, the spring 88 is in a relaxed, extended condition, such that the shutter system 20, and more specifically the moveable shutter 24 and the fixed shutter 32, is spaced from the brace 44. Additionally, the plurality of moveable shutter apertures 26 and the plurality of fixed shutter apertures 38 are misaligned. The bell crank 60 is shown in this position to be located proximate the first end 96 of the cam shaft 86, with the at least one protrusion 68 engaged with the cam track 100. As an object, such as an electrical device, is inserted into the switchgear compartment 10, the pusher 22 is engaged and a force is applied on the pusher 22, as well as the shutter system 20, toward the brace 44.

Figure 7:
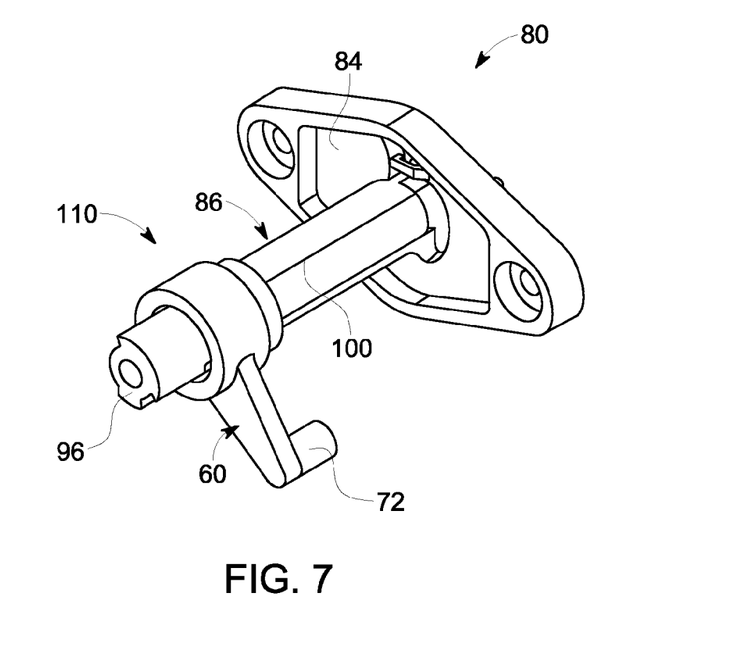
FIG. 7 is a perspective view of the cam member and the bell crank of the shutter system in a partially closed position.

Referring to FIG. 7, the bell crank 60 and therefore the shutter system 20 is illustrated in an intermediate position 110 between the closed position 40 and the open position 42. The intermediate position 110 refers to a position where the bell crank 60 has been guided by the cam track 100 to impart both rotation and translation of the bell crank 60. Specifically, the bell crank 60 has been rotated based on the cam track 100 geometry, while translation of the bell crank 60 along the cam shaft 86 from the first end 96 toward the cam base portion 84 is achieved by the force applied to the pusher 22 by the electrical device being inserted into the switchgear compartment 10.

Figure 8:
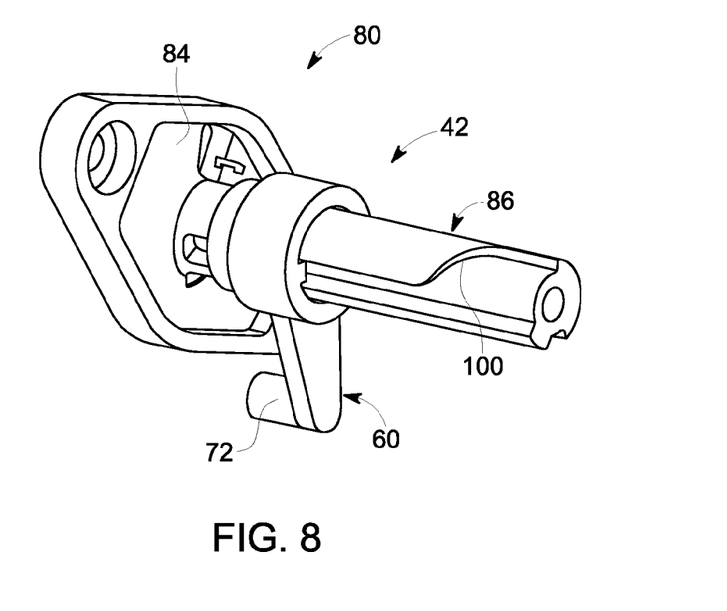
FIG. 8 is a perspective view of the cam member and the bell crank of the shutter system in the open position.

Referring to FIGS. 4 and 8, the bell crank 60 and therefore the shutter system 20 is illustrated in the open position 42. In the open position 42, the pusher 22 has been fully moved toward the brace 44, such that the spring 88 is in a compressed condition. Additionally, the bell crank 60 has translated to a location on the cam shaft 86 proximate the cam base portion 84 and has been rotated an angle required to align the plurality of moveable shutter apertures 26 with the plurality of fixed shutter apertures 38.

It can be appreciated that upon removal of the electrical device from the switchgear compartment 10, the biasing force of the spring 88 forces the fixed shutter 32 and the moveable shutter 24 away from the cam base portion 84 and the brace 44 to provide spacing therebetween. During the extension of the spring 88 and movement of the moveable shutter 24 and the fixed shutter 32, the bell crank 60 is rotated during travel along the cam track 100, thereby restoring the moveable shutter into the closed position 40 by misaligning the plurality of moveable shutter apertures 26 and the plurality of fixed shutter apertures 38. In one embodiment, the fixed shutter 32 and the moveable shutter 24 are disposed in contact in the open position 42, such that a frictional force is exerted on the moveable shutter 24 at the outset of movement toward the open position 42. In such an embodiment, an extension spring 8 is operably coupled to the moveable shutter 24 and the fixed shutter 32 to impart a force on the moveable shutter 24 upon the initiation of movement from the closed position 40 to the open position 42. Advantageously, a repeatable opening and closing of the shutter system 20 is achieved upon insertion and removal of the electrical device.

Figure 9:
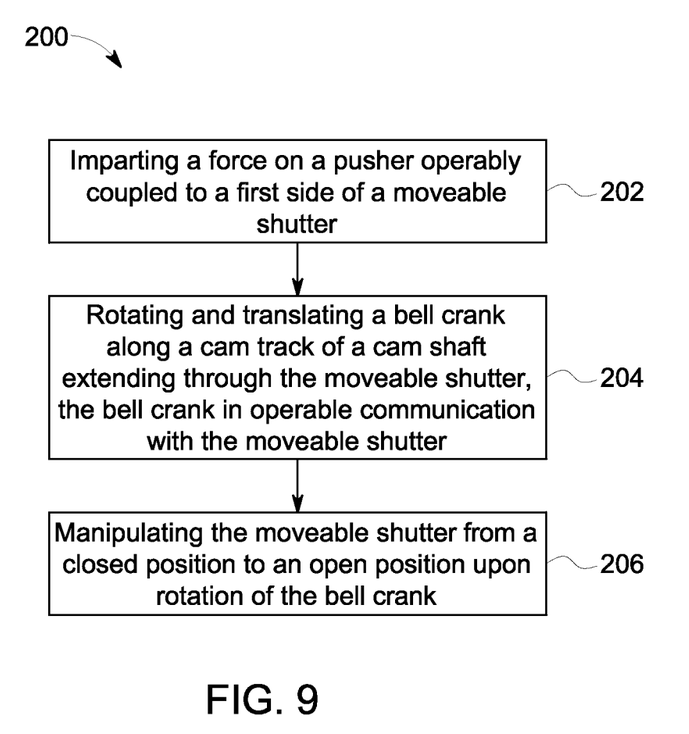
FIG. 9 is a flow diagram illustrating a method of manipulating the shutter system of the switchgear compartment.

As illustrated in the flow diagram of FIG. 9, and with reference to FIGS. 1-8, a method of manipulating a shutter system for a switchgear compartment 200 is also provided. The switchgear compartment 10 and the shutter system 20 have been previously described and specific structural components need not be described in further detail. The method of manipulating a shutter system for a switchgear compartment 200 includes imparting a force on a pusher operably coupled to a first side of a moveable shutter 202. A bell crank is rotated and translated along a cam track of a cam shaft extending through the moveable shutter 204 and the moveable shutter is manipulated from a closed position to an open position upon rotation of the bell crank 206.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A shutter system for a switchgear compartment comprising:
    a moveable shatter translatable between a first position and an second position;
    a pusher operatively coupled to a first side of the moveable shutter and configured to impart a force on the moveable shutter in response to an insertion of an electrical device within the switchgear compartment;
    a cam member having a cam shaft operatively coupled to the moveable shutter, the cam shaft having a cam track; and
    a bell crank configured to move along the cam track of the cam shaft and translate the moveable shutter between the first position and the second position.

2. The shutter system of claim 1, wherein the bell crank includes an opening defining an inner surface with at least one protrusion disposed along the inner surface, the at least one protrusion operatively coupled to the cam track, and configured to move along the cam track.

3. The shutter system of claim 1, further comprising a fixed shutter having a first surface disposed proximate a second side of the moveable shutter and defining a plurality of fixed shutter apertures.

4. The shutter system of claim 3, wherein the moveable shutter defines a plurality of moveable shutter apertures, wherein the plurality of moveable shutter apertures is aligned with the plurality of fixed shutter apertures in the first position, and wherein the plurality of moveable shutter apertures is misaligned with the plurality of fixed shutter apertures in the second position.

5. The shutter system of claim 3, further comprising a retainer plate disposed proximate a second surface of the fixed shutter and secured to the pusher, the cam shaft operatively coupled to the retainer plate.

6. The shutter system of claim 5, wherein the retainer plate includes an opening configured to receive an aft portion of the bell crank, the opening defining a bell crank axis of rotation.

7. The shutter system of claim 1, the pusher comprising a relatively U-shaped inner surface, the cam shaft disposed on the relatively U-shaped inner surface.

8. The shutter system of claim 5, further comprising, a spring, disposed between the retainer plate and a cam base portion of the cam member, the spring configured to bias the fixed shutter and the moveable shutter away from the cam base portion.

9. The shutter system of claim 8, wherein the spring is configured to position the moveable shutter in the first position in response to a removal of the electrical device from the switchgear compartment.

10. A shutter system for a switchgear compartment comprising:
    a fixed shutter defining a plurality of fixed shutter apertures;
    a moveable shutter defining a plurality of moveable shutter apertures, the moveable shutter comprising an open position and a closed position, wherein the plurality of moveable shutter apertures is aligned with the plurality of fixed shutter apertures in the open position, and wherein the plurality of moveable shutter apertures is misaligned with the plurality of fixed shutter apertures in the closed position;

a pusher operatively coupled to a first side of the moveable shatter;

a bell crank in operable communication with the moveable shutter; and a cam member operably coupled to at least one wall of a breaker compartment and comprising a cam shaft operatively coupled to the fixed shutter and the moveable shutter, the cam member having a cam track configured to guide the bell crank to translate the moveable shutter between the closed position and the open position.

11. The shutter system of claim 10, wherein the bell crank includes an opening defining an inner surface with at least one protrusion disposed along the inner surface the at least one protrusion operatively coupled to the cam track and configured to guide along the cam track.

12. The shutter system of claim 10, further comprising a retainer plate disposed proximate the fixed shutter and secured to the pusher, the cam shaft operatively coupled to the retainer plate.

13. The shutter system of claim 12, wherein the retainer plate includes an opening configured to receive an aft portion of the bell crank.

14. The shutter system of claim 10, the pusher comprising a relatively U-shaped inner surface, the cam shaft disposed on the relatively U-shaped inner surface.

15. The shutter system of claim 12, further comprising a spring disposed between the retainer plate and a cam base portion of the cam member, the spring configured to bias the fixed shutter and the moveable shutter away from the cam base portion in response to a removal of the electrical device from the switchgear compartment.

16. The shutter system of claim 15, wherein the spring is configured to position the moveable shutter in the closed position.

17. A method of manipulating a shutter system for a switchgear compartment comprising:
    imparting a force on a pusher operatively coupled to a first side of to moveable shutter;
    rotating and translating a bell crank along a cam track of a cam shaft extending through the moveable shutter, the bell crank in operable communication with the moveable shutter; and
    translating the moveable shutter from a first position to an closed position upon rotation of the bell crank.

18. The method of claim 17, further comprising guiding a protrusion extending inwardly from an inner surface of the bell crank, the bell crank inner surface defined by an opening disposed thereon, along the cam track for guiding the bell crank.

19. The method of claim 17, further comprising compressing a spring disposed between a fixed shutter and a cam base portion of a cam member during translation of the moveable shutter from the first position to the second position, the spring biasing the fixed shutter and the moveable shutter away from the cam base portion toward the second position.

20. The method of claim 17, further comprising:
    aligning a plurality of moveable shutter apertures of the moveable shutter with a plurality of fixed shutter apertures of a fixed shutter in the first position; and
    misaligning the plurality of moveable shutter apertures with the plurality of fixed shutter apertures in the second position.

* * * * *